(12) United States Patent
Brown et al.

(10) Patent No.: US 8,144,453 B2
(45) Date of Patent: Mar. 27, 2012

(54) INTEGRATED FEATURE FOR FRICTION LESS MOVEMENT OF FORCE SENSITIVE TOUCH SCREEN

(75) Inventors: Daniel Edward Brown, Newark, CA (US); Caleb Daniel Brown, Newark, CA (US); Anders L. Mölne, Cary, NC (US)

(73) Assignee: F-Origin, Inc., Morrisville, NC (US)

( * ) Notice: Subject to any disclaimer, the term of this patent is extended or adjusted under 35 U.S.C. 154(b) by 81 days.

(21) Appl. No.: 12/450,138

(22) PCT Filed: Mar. 14, 2008

(86) PCT No.: PCT/US2008/003374
§ 371 (c)(1),
(2), (4) Date: Sep. 11, 2009

(87) PCT Pub. No.: WO2008/115408
PCT Pub. Date: Sep. 25, 2008

(65) Prior Publication Data
US 2010/0103640 A1    Apr. 29, 2010

Related U.S. Application Data

(60) Provisional application No. 60/918,275, filed on Mar. 15, 2007.

(51) Int. Cl.
G06F 1/16    (2006.01)
G06F 3/041    (2006.01)
H05K 5/00    (2006.01)
H05K 7/00    (2006.01)

(52) U.S. Cl. ......... 361/679.21; 361/679.02; 361/679.26; 345/173

(58) Field of Classification Search ............. 361/679.01, 361/679.02, 679.21, 679.26; 345/173
See application file for complete search history.

(56) References Cited

U.S. PATENT DOCUMENTS

| | | | | |
|---|---|---|---|---|
| 3,274,419 | A * | 9/1966 | Roth | 313/503 |
| 4,234,907 | A * | 11/1980 | Daniel | 362/556 |
| 4,355,202 | A * | 10/1982 | DeCosta et al. | 178/20.02 |
| 4,511,760 | A | 4/1985 | Garwin et al. | |
| 5,038,142 | A * | 8/1991 | Flower et al. | 341/34 |
| 5,541,372 | A * | 7/1996 | Baller et al. | 178/18.01 |
| 5,543,588 | A * | 8/1996 | Bisset et al. | 178/18.06 |
| 5,579,036 | A * | 11/1996 | Yates, IV | 345/173 |
| 5,659,376 | A * | 8/1997 | Uehara et al. | 349/58 |
| 5,663,573 | A * | 9/1997 | Epstein et al. | 257/40 |
| 5,675,397 | A * | 10/1997 | Fukushima | 349/149 |
| 5,710,607 | A * | 1/1998 | Iwamoto et al. | 349/60 |

(Continued)

*Primary Examiner* — Jinhee Lee
*Assistant Examiner* — Adrian S Wilson
(74) *Attorney, Agent, or Firm* — Ober, Kaler, Grimes & Shriver; Royal W. Craig

(57) ABSTRACT

A suspension system for a differential-pressure touch sensitive panel suspended over force sensors, for use in either fixed or mobile devices such as point of sales terminals, kiosks, laptops, monitors, PDAs, cell phones, UMPCs and more. In one embodiment, each side of the lens is encircled and supported by a looped string, monofilament or flexible wire, which is then looped around the back cover or base plate, forming a figure-8. The figure 8-*loops* bring the lens into a fixed state in the xy-plane without the addition of any friction causing physical contact. Other alternative implementations include continuous suspensions, bender suspensions and 3-dimensional force suspensions. Moreover, the present invention proposes the use of a flexible padding under the force sensors to allow the sensors to be slightly preloaded, which reduces the dependency on extremely tight mechanical tolerances.

28 Claims, 11 Drawing Sheets

U.S. PATENT DOCUMENTS

| | | | | |
|---|---|---|---|---|
| 5,714,694 | A * | 2/1998 | Diessner | 73/862.632 |
| 5,729,249 | A * | 3/1998 | Yasutake | 345/173 |
| 5,808,707 | A * | 9/1998 | Niibori et al. | 349/60 |
| 6,088,069 | A | 7/2000 | Farlow | |
| 6,118,434 | A * | 9/2000 | Nishitani et al. | 345/173 |
| 6,181,555 | B1 * | 1/2001 | Haley et al. | 361/679.21 |
| 6,205,690 | B1 * | 3/2001 | Heropoulos et al. | 40/442 |
| 6,216,329 | B1 * | 4/2001 | Kaga et al. | 29/458 |
| 6,511,198 | B1 * | 1/2003 | Erickson | 362/103 |
| 6,545,733 | B2 * | 4/2003 | Kaga et al. | 349/58 |
| 6,654,232 | B1 * | 11/2003 | Tsao et al. | 361/679.59 |
| 6,751,898 | B2 * | 6/2004 | Heropoulos et al. | 40/544 |
| 6,822,635 | B2 * | 11/2004 | Shahoian et al. | 345/156 |
| 6,879,318 | B1 | 4/2005 | Chan et al. | |
| 6,909,475 | B2 * | 6/2005 | Kojima et al. | 349/58 |
| 7,158,122 | B2 * | 1/2007 | Roberts | 345/173 |
| 7,176,897 | B2 * | 2/2007 | Roberts | 345/173 |
| 7,248,305 | B2 * | 7/2007 | Ootsuta et al. | 349/12 |
| 7,312,791 | B2 * | 12/2007 | Hoshino et al. | 345/173 |
| 7,379,128 | B2 * | 5/2008 | Tsubokura et al. | 349/60 |
| 7,453,192 | B2 * | 11/2008 | Lee | 313/288 |
| 7,554,798 | B2 * | 6/2009 | Tanokuchi et al. | 361/679.21 |
| 7,745,018 | B2 * | 6/2010 | Murasko et al. | 428/690 |
| 7,834,287 | B2 * | 11/2010 | Heiman et al. | 200/600 |
| 2002/0149561 | A1 * | 10/2002 | Fukumoto et al. | 345/156 |
| 2002/0149571 | A1 * | 10/2002 | Roberts | 345/174 |
| 2002/0155214 | A1 * | 10/2002 | Murasko et al. | 427/66 |
| 2002/0163509 | A1 * | 11/2002 | Roberts | 345/173 |
| 2002/0175836 | A1 * | 11/2002 | Roberts | 341/34 |
| 2003/0160768 | A1 * | 8/2003 | Tanabe et al. | 345/173 |
| 2003/0206162 | A1 * | 11/2003 | Roberts | 345/173 |
| 2003/0223187 | A1 * | 12/2003 | Tsao et al. | 361/681 |
| 2004/0108992 | A1 | 6/2004 | Rosenberg | |
| 2004/0108995 | A1 * | 6/2004 | Hoshino et al. | 345/173 |
| 2004/0125044 | A1 | 7/2004 | Suzuki | |
| 2006/0209037 | A1 * | 9/2006 | Wang et al. | 345/173 |
| 2007/0182877 | A1 * | 8/2007 | Tanokuchi et al. | 349/58 |

* cited by examiner

A

B

T-TR: Top plate, Top Right corner
T-TL: Top plate, Top Left corner
T-BR: Top plate, Bottom Right corner
T-BL: Top plate, Bottom Right corner
B-TR: Bottom plate, Top Right corner
B-TL: Bottom plate, Top Left corner
B-BR: Bottom plate, Bottom Right corner
B-BL: Bottom plate, Bottom Right corner

INTEGRATED FEATURE FOR FRICTION LESS MOVEMENT OF FORCE SENSITIVE TOUCH SCREEN

CROSS-REFERENCE TO RELATED APPLICATIONS

This application is a National Stage of International Application No. PCT/US2008/003374, filed Mar. 14, 2008, which claims the benefit of U.S. Provisional Patent Application No. 60/918,275, filed Mar. 15, 2007, which is incorporated by reference in its entirety.

BACKGROUND OF THE INVENTION (1) Field of the Invention

The present invention relates to mechanical touch input systems such as touch pads and touch screens used in fixed or mobile devices, such as point of sales terminals, kiosks, laptops, monitors, PDAs, cell phones, UMPCs and more, that require the touch component to be fully constrained in two directions (x & y), but requiring unencumbered freedom to translate in the third direction (z-direction).

(2) Description of Prior Art

The concept of using multiple force sensing sensors to register, measure and triangulate the touched position of a touch screen has been a known concept for more then twenty years, however, to produce a high quality touch screen solution has proven difficult.

Over the last few years the performance of force sensors has improved substantially and the component cost has been reduced to commercially viable prices. In addition, there has been software advances, creating an environment ready for high volume product implementations of touch screens based on force sensing. There is however still one major problem that must be overcome, the mechanical implementation.

For the typical force based touch screen implementation, the input device consists of a free standing touch screen lens or the actual LCD module. This touch screen lens rests on 3 or more force sensing sensors that are placed on a rear cover or some type of rigid surface, such as a PC Board or a back plane. The overall mechanical housing holds the different components in place as a system with different types of mounting mechanisms, which allow for movement in the lens, yet keeps the lens in place and pressed towards the force sensors. The force sensors are electrically connected, sometimes signal amplified, and converted from analog to digital so that sensor readings may be provided to the touch screen control software running on the device processor or on a separate micro controller. It should also be mentioned that most force sensors are designed to measure vertical forces and have minimal to no tolerances to measure forces accurately that are not applied exactly straight into the sensors measurement plane.

The mounting mechanism of the touch screen is an active part of the touch screen and refers to the way the top lens, which is used as an input device, and the sensors that measure the position and the amount of exerted force, are mounted on base plate. Until now, production of force based touch screen devices with high accuracy has been a challenge due to large errors in reading and interpreting the force. The errors occur because the forces introduced by the mechanical devices are not countered sufficiently and very difficult to account for. For example, the lens needs to allow for movement in the z direction, but must be fixed in the xy-plane in order to not introduce side movement and to minimize side forces. The lens also needs to be pre-loaded to ensure that the touch screen lens always remains in contact with the force sensors, even if the unit is moving or being turned upside-down. Adding a pre-loading solution will also introduce non-linear forces that are difficult to correctly account for, especially since the direction of gravity is typically unknown.

For example, U.S. Pat. No. 4,511,760 to Garwin et al. issued Apr. 16, 1985 shows a force sensing data input device responding to the release of pressure force. The input surface is provided with a transparent faceplate mounted on force-sensing piezoelectric transducers. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum for the pushing direction. The individual outputs of the four sensors at the time that the peak of the sum occurs are used to calculate the point of application of the force. This mechanical construct is using spring clips to pre-load the sensors and to keep the mechanical assembly in place. These spring clips could theoretically minimize movement in xy-plane, but will provide non-linear additions to the total forces as the lens is touched since the spring loading force will change as the lens is pressed (and moved) in the z-plane. The position of the pre-loading springs will also add to the complexity since they are adding forces that bends the lens over the sensors.

U.S. Pat. No. 5,038,142 to Flower et al. (IBM) issued Aug. 6, 1991 shows a touch sensing display screen supported by stiff springs having essentially uniaxial freedom of motion. Strain gauge sensors are applied directly to the springs and a processor calculates the X, Y and Z coordinate information. This configuration is similar to the above-referenced Gawin patent inasmuch as it employs a basic spring construction for allowing movement in z-direction but restricting the xy-plane. Again there are likely a lot of uncontrollable forces. U.S. Pat. No. 6,879,318 by Chan et al. issued Apr. 12, 2005 shows a touch screen mounting assembly for a liquid crystal display panel LCD including a bottom frame, a backlight panel seated in the frame and that has a plurality of pressure-sensitive transducers mounted thereon, a liquid crystal display panel, and a top frame for exerting pressure when mounted to the bottom frame such that a plurality of compressible springs biases the LCD panel towards the bottom frame when touched or contacted by a user. The bottom and top frame assembly with backlight panel are mounted therein on springs, with an overlying LCD panel. Spring loaded mounting screws will allow for movement in the z-plane and pre-loading, but non-linear forces from pre-loading as well as lens friction will be present.

Two core problems have been identified in the foregoing references and other existing mechanical solutions for force based touch screens.

The first problem identified is the extremely small tolerances required for the mechanical build-up. The issue is that the touch screen needs to be extremely rigid, since if the lens bends part of the force will be captured in the lens material or even lost in heat dissipation. Unfortunately, in making the sensor mounting surface as well as the lens (which rests on top of the sensor) extremely rigid, there is no longer any accommodation for mechanical tolerances. The sensor must fit the components exactly (within $\frac{1}{100}$s of a mm), or else the lens will ether not be in contact or must be forced down and be bent) through pre-loading. Due to the very small movement allowed within the force sensor and the use of rigid and parallel surfaces, keeping the top plate at the same distance and parallel to the base consistently, before and after the pressure is applied, remains a challenge both from a production as well as a measurement perspective.

The second core problem is the interference from other forces. Typical problems arises from non-linear forces, when there is contact and friction between the lens and other mechanical components, and from pre-loading, where the applied preloading creates non-linear additional forces as the lens is pressed down and some of the pre-loading forces are neutralized through the new and additional forces loading the lens towards the sensors. In addition, there may be bending in the materials, where some of the force is lost into side forces and heat.

These problems surface as the following symptoms:

1) Low accuracy: Approximately 1-10% of total distance between sensor in positioning error 2) Repeating the same operation such as drawing a line, but starting from the opposite direction does not yield the same results (due to interference of lateral forces an/or actual side movement of lens transferred to the force sensors)

3) Greater amount of the touch force is required in order to compensate for the mounting mechanisms' pushback forces 4) Loss of sensitivity since a high minimum force (approximately >20 gf) is required in order to eliminate inaccuracies from non-linear forces from friction, pre-loading or material bending.

5) An elaborate mounting mechanism of the top plate is needed to keep the sensors flat. The mounting adds to the forces that interfere with the measurements.

6) Difference in positioning calculation, that is different size and type of accuracy error, at different force levels.

Current precision instruments that incorporate precision bearing slide mechanisms try to offset the drag or friction when a shaft or feature is actuated through them. However, these parts can be somewhat bulky and pricey. In much more size constrained assemblies, or high volume manufacturing applications, a smaller or lower cost solution is needed.

It would be more advantageous to provide a suspension system for a touch-screen display that does not introduce any additional friction or non-linear forces to the touch screen system. It would also be desirable to reduce the dependency on extremely tight mechanical tolerances, which is a common problem in the above-described prior art force-based touch screens, and it is, therefore, an objective of current invention to address these needs with a more efficient mechanical construction.

SUMMARY OF THE INVENTION

It is therefore an object of this invention to define and illustrate a mechanical suspension for a touch screen display/pad that does not add any additional non-linear forces to a touch screen system.

It is also the object of the present invention to provide a method and apparatus for providing frictionless translation ability in one direction, while constraining one or more parts from movement in the two other directions.

It is also another object to provide a frictionless motion translation mechanism for a variety of mechanical systems including touch screens that require components to be fully constrained in two directions (x & y), and yet require unencumbered freedom to translate in the third direction (z-direction).

It is still another object to provide a frictionless motion translation mechanism as described above that can be contained within the existing parts, and need not require the use of separate bearings or precision constraint parts.

Another important object of this invention is to reduce the dependency on extremely tight mechanical tolerances by pre-loading the sensor.

In accordance with the foregoing objects, the present invention is a touch input comprising a touch lens suspended over force sensors by a new and innovative suspension mechanism, for use in either fixed or mobile devices such as point of sales terminals, kiosks, laptops, monitors, PDAs, cell phones, UMPCs and more. The suspension mechanism is scalable and can be varied in size and pre-loading pressure. The solution can also be manufactured at high volumes and at a low cost and is suitable for touch screen based products ranging from cellular phones and personal digital assistance up to computer monitors and plasma TVs/Monitors. The touch sensitive lens may also be either a separate touch lens made out of plastic or computer glass, or it may be the actual display module.

More specifically, the foregoing is accomplished by connecting each side of the lens with a looped string, monofilament or flexible wire, which is then looped around the back cover or base plate, forming a figure-8. The figure 8-loops bring the lens into a fixed state in the xy-plane without the addition of any friction causing physical contact. A smaller portion of the force applied by the figure 8-loop also directs the touch screen and the back plate together, providing a pre-loading onto the force sensors.

Alternative implementation and manufacturing methods of the above described figure 8-loop suspension system is disclosed one in which the suspension wire is threaded through holes. This manufacturing method not only reduces the manufacturing costs, but also optimizes the performance of the suspension mechanism.

Other alternative implementations include continuous suspension, bender suspension and 3-dimensional force suspension. As further described below, these suspension methods also ensures friction-free or close to friction-free movement in the z-plane while locking the lens in the xy-plane and thereby ensuring no movement or introduction of unknown forces to the system.

Another important improvement lies in the use of a flexible padding between the rigid back plane and the sensor allowing the sensor to be slightly compressed, e.g., preloaded, which reduces the dependency on extremely tight mechanical tolerances.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a mechanical suspension for a touch screen display that does not add any additional non-linear forces to a touch screen system, and which preloads the touch screen sensor(s) to alleviate the need for extremely tight mechanical tolerances. The invention adapts a unique and different approach for mechanically connecting a touch screen lens to the force sensors, and to also provide a pre-loading force against the sensors with minimal non-linear changes over applied force pressure.

The illustrated embodiments of the present invention adhere to the following principles which are required for proper operation.

The two opposing surfaces defined by the touch lens and sensor mounting plane, need to be flat and parallel.

The touch lens needs to touch the sensors when at rest (non-touch mode), with or without pre-loading applied.

The touch lens needs to be free to move down towards the bottom plate when a force is applied on the top of it.

The touch lens needs to be fixed in the xy-plane, enough to eliminate frictional forces or side movements of the lens.

Pre-loading must not introduce new non-linear forces to the system, especially from bending of the lens and/or the backplane.

Figure 1:
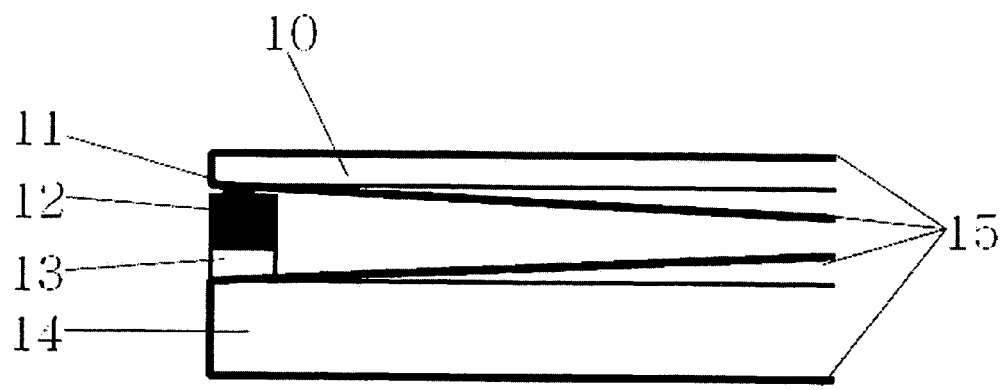
FIG. 1 represents part of a touch screen system showing a force sensor between the touch lens and the back cover or LCD module.

FIG. 1 represents part of a touch screen system employing the foregoing principles, showing a force sensor 12 between a touch lens 10 and a rigid backplane 14 defined by a back cover or LCD module. The touch lens 10 will typically be made out of computer glass or treated plastic. The force sensor 12 is preferably mounted on a rubberized gasket 13 or padding made of Poron™ for example, to eliminate the need for exact placement or for bending of the lens 10, as well as to provide additional spring-like preloading force to minimize the impact from shock and vibration. The maximum allowed movement, as allowed by the internal compression of the sensor 12 and the padding 13 is typically between 0.01-0.3 mm, but may be larger depending on sensor, padding material and operational force range. Each force sensor 12 may comprise a conventional piezo-resistive force sensor with a detent steel ball 11 or other force carrier, mounted therein to channel the force to the internal piezo membrane, where the applied force can be detected and measured.

Figure 8:
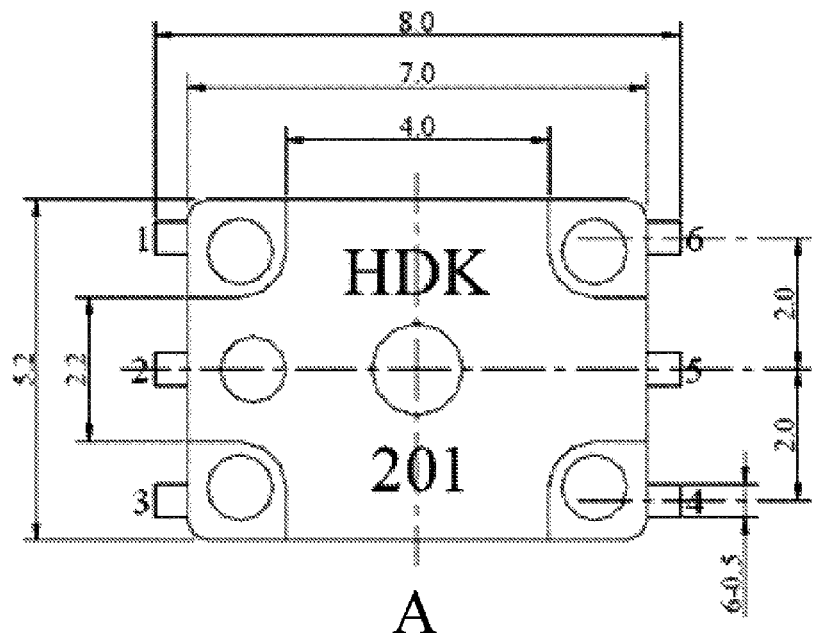
FIG. 8 comprises schematic pictures of an HDK™ piezo resistive force sensor.
Figure 8:
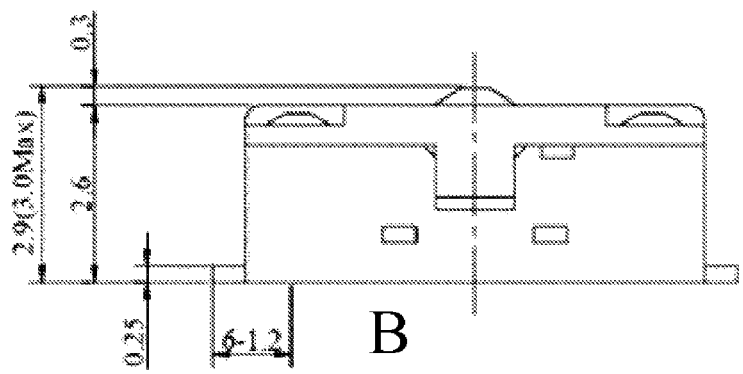

For example, FIG. 8(A, B) comprises top and side illustrations of a suitable HDK™ piezo resistive force sensor. Other force sensors, such as FSR or FTR sensors may also be used.

Given a plurality (such as, for example, four) differentially-mounted force sensors 12, each sensor 12 registers a different force as a function of the two-dimensional (x, y) coordinates along the plane of the lens 10. By calculating the differential pressure at the corners the exact coordinate of the actual touch can be calculated.

In accordance with the present invention (referring back to FIG. 1), a plurality of suspension mechanisms 15 encircle both the lens 10 and backplane 14, one suspension 15 around each of the four sides. Preferably, four orthogonal suspension mechanisms 15 are used along each of the four sides of the lens/backplane structure and collectively hold the touch lens 10 and the backplane 14 in parallel alignment.

Figure 2:
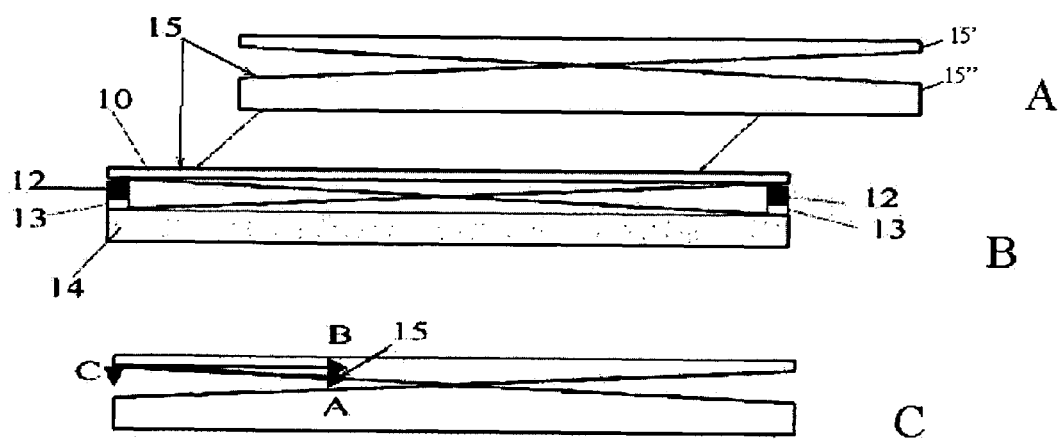
FIG. 2 illustrates the figure-8 suspension mechanism on one of the 4 sides, holding the touch lens and the back ground aligned

FIG. 2(A-C) illustrates one embodiment of the above-described suspension mechanism 15 formed as a figure-8, and shows how it is applied to one of the four sides of the lens 10/backplane 14 structure, holding the touch lens 10 and the backplane 14 aligned. The suspension mechanisms 15 may be formed of string, wire, monofilament, leaf-spring metal or plastic, or any other material that provides the desired balance of tightening force versus shape-memory flex. The figure 8-shaped suspension mechanism 15 includes an upper loop (15') circled around the lens 10 and integrally joined to a lower loop (15") circled around the backplane 14. All four sides of the lens 10/backplane 14 structure are bound together with four figure 8-shaped suspension mechanisms 15 as illustrated in FIG. 2. Note that by tightening either loop along the direction of arrow A (as seen at FIG. 2(C)), a majority of the vector tightening force as seen by arrow B pulls the lens 10 towards the center in relation to the backplane 14. The level of tightening force in the suspension mechanism 15 is adjusted to ensure that a sufficient and correct pre-loading force C is pressing the lens towards the force sensors.

Figure 3:
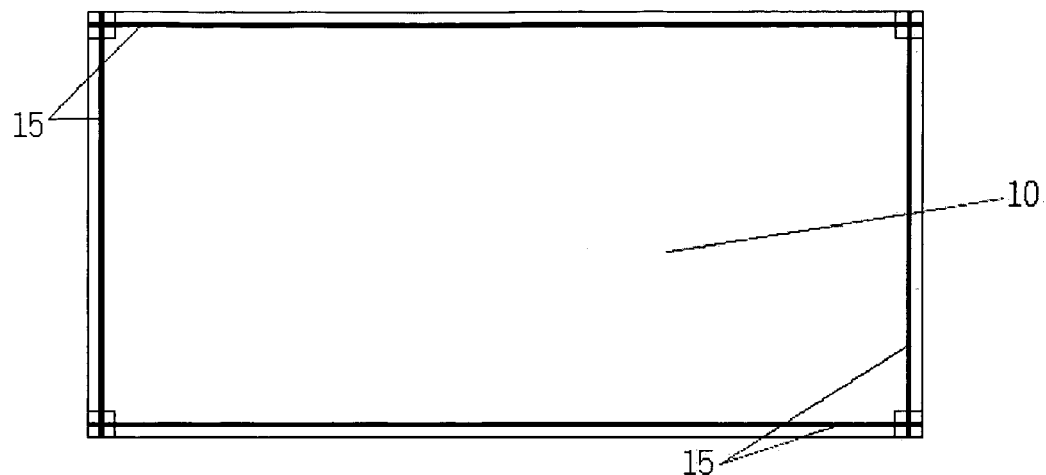
FIG. 3 shows the components of FIG. 2 but from a top-side view, looking down onto the touch screen.

FIG. 3 shows the same plurality of suspension mechanisms 15 encircling both the lens 10 and backplane 14 as in FIG. 2 but from a top-side view, looking down onto the touch screen. As illustrated in FIG. 3, the four figure-8 shaped suspension mechanisms 15 loop around and hold the four sides of the lens 10 in place in the xy-plane. As the centering forces A (FIG. 2) pull each of the 4 corners toward the center the need for holding the lens 10 in place through any additional construction (which tends to add unwanted friction forces) is eliminated. A smaller vector component C of the tightening force A (from FIG. 2) pulls the 4 corners of the lens 10 towards the backplane and thereby provides the required pre-loading force.

Another potential problem with alignment and tolerances is seen in FIG. 2. With four (or more) force sensors 12 placed in each corner of the lens 10, sandwiched between the rigid touch lens 10 and the rigid backplane 14, there is a risk that the mechanical structure is not perfectly aligned and (without loading) the flat lens 10 will only lie flat against three of the sensors 12. Unless all sensors 12 are in contact with the lens 10, the software will not be able to calculate the exact touch coordinates. One alternative is to add enough preload force so that the lens 10 bends down to all force sensors 12. However, testing shows that the bending adds mechanical strain, which will create additional non-linear forces that will influence the positioning calculation and add accuracy errors that cannot be fully compensated for in software. A better solution to this problem is solved by a layer of padding 13, which may be a thin layer of flexible material such as Poron™ positioned under each sensor 12. Typically a layer of Poron™ open celled microcellular polyurethane at 0.2 mm to 0.6 mm provides enough flexibility between the parallel planes, without adding too much movement in the sensor structure. It is important that the padding 13 impart a minimal upward bias to the sensors 12 to keep them in contact with the lens 10, but the maximum compression of the padding 13 should be kept at a minimum. One skilled in the art should understand that the "padding" material 13 can also be replaced by a more traditional leaf-spring or coil-spring type of component.

In actual testing, the above-described Poron™ padding 13 made it possible to distinguish the touch coordinates with substantially higher accuracy than a pre-loaded model without the Poron™ under the force sensors 12. Actual performance enhancement will depend on the material tolerances and the sensor type.

The invention counteracts the interfering forces in a force-based touch screen device, minimizing them to the point that the software formulas start working with much higher accuracy. It also removes the need for an elaborate mounting mechanism for the top plate or lens 10, and eliminates the need for traditional pre-loading structure over the sensors 12, such as springs or metal clamps pressing down on the lens 10 over the sensors 12.

Figure 4:
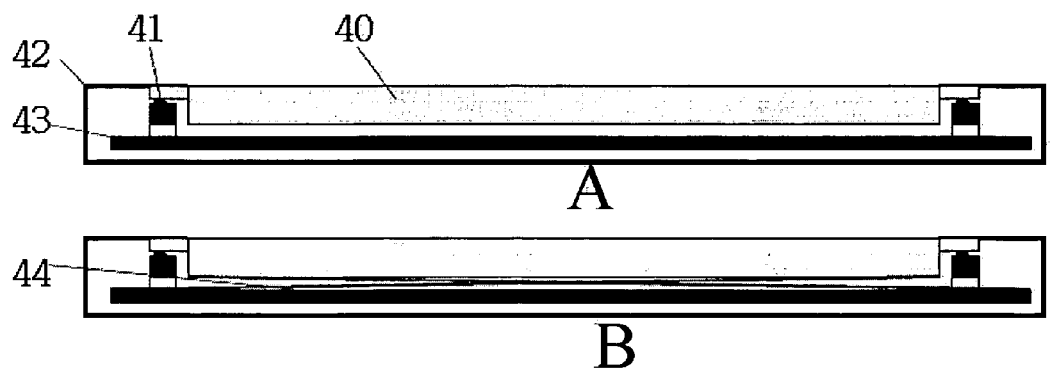
FIG. 4 illustrates an alternative implementation from FIG. 2, where the touch screen is the actual LCD module.

FIG. 4 illustrates an alternative embodiment wherein the touch screen 40 is the actual LCD display module (there is no lens 10 or the lens is integral to the LCD). As before, this embodiment is likewise a figure 8-loop suspension mechanism 44, but here the figure 8-loops are wrapped around the display module 40 and the underlying mechanics, such as the printed circuit board (PCB) 43 of the device. Preferably, four figure-8 suspension mechanisms 44 are used, each encircling one of the four sides of the LCD 40/PCB 43 structure, holding the two in alignment.

Figure 5:
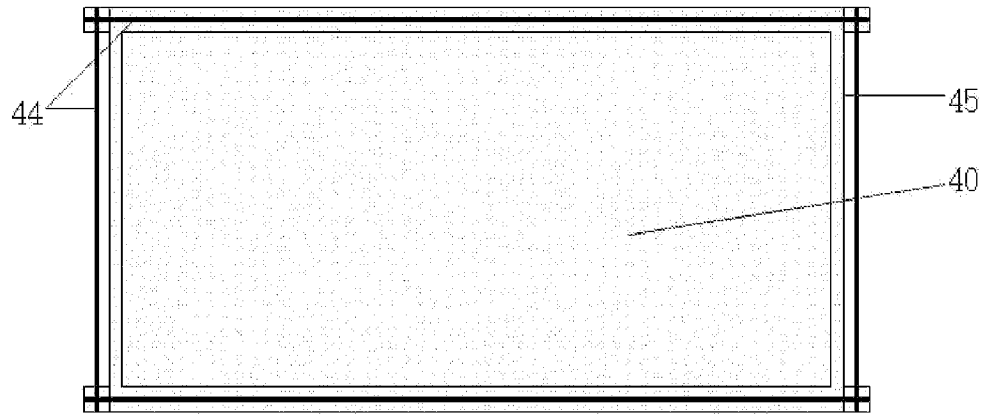
FIG. 5 shows the components of FIG. 4 but from a top-side view, looking down onto the touch screen.

FIG. 5 shows the components of FIG. 4 from a top-side view, looking down onto the touch screen 40. Unlike the other embodiments where the touch lens 10 is suspended above the display module, here the actual LCD module 40 is the touch sensitive lens. This design approach may be more advantageous for more compact implementations since it can fit in a smaller display housing 45 and is therefore preferred for small footprint implementations such as mobile phones.

As illustrated in FIG. 5, the LCD module 40 or the frame of the module 45 may be extended above the force sensors 41, still keeping the figure 8-loop suspension mechanisms 44 in place. The same mechanical concept is also shown in FIG. 4 where the display module 40 extends over the force sensors 41. One advantage of this is that the force sensors 41 can now be placed in the same plane as the display module 40 and thereby supporting a more height-compact implementation. Additional height is saved since the display module 40 acts as the actual lens and only a thin computer glass cover (or none at all) needs to be added to the display. This eliminates the need for a thicker freestanding lens as well as the air space between the lens and the display.

Figure 6:
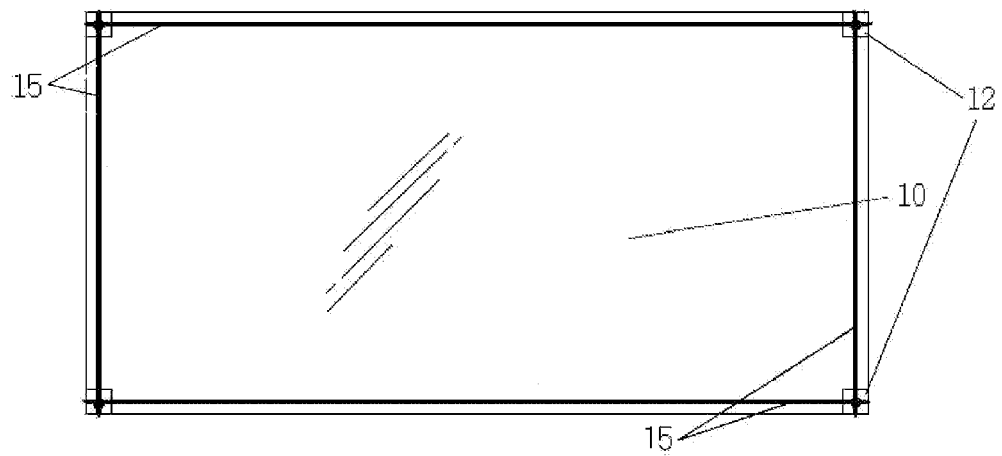
FIG. 6 shows an actual implementation of the system from FIG. 3, where both touch lens and back cover are made up from clear glass plates.

FIG. 6 shows a top view of the actual implementation of the system from FIG. 3, where both touch lens 10 and back cover 14 comprise clear glass plates. The glass provides both a view through the system as well as very flat and rigid planes.

Figure 7:
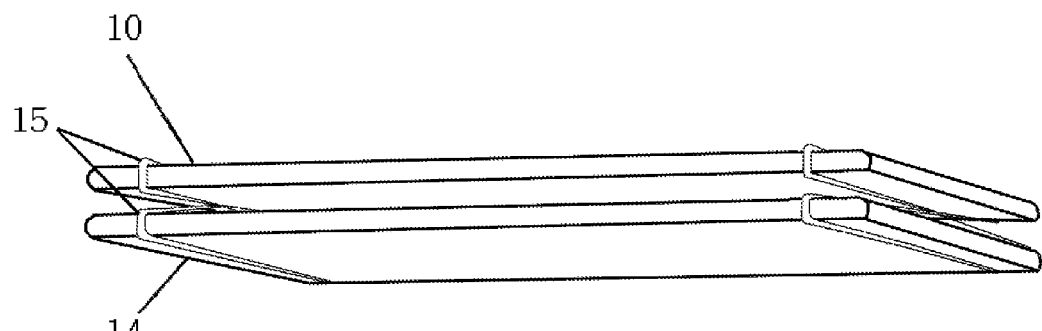
FIG. 7 shows an actual implementation of the system from FIG. 2, where both touch lens and back cover are made up from clear glass plates.

FIG. 7 shows a side view of the actual implementation of the system from FIG. 3, where both touch lens 10 and back cover 14 are made up from clear glass plates, and figure 8-loop suspension mechanisms 15 each comprise a length of monofilament closed into a loop with a small metal clasp, and then crossed into a figure-8 configuration.

In practical testing, it was found that improved performance can be had by not fixing the figure 8-loop suspension mechanisms 15 in place on the lens 10 or backplane 14, but instead to allow them to "move" freely around both lens and backplane, as illustrated in FIG. 7. Here the structure is simplified so that both lens 10 and backplane 14 are made up by two glass plates with four force sensors 12 placed in each corner. Here the suspension mechanisms 15 each comprise a figure 8-looped monofilament line encircling and holding the plates 10, 14 in place on all four sides, also as illustrated in FIG. 6. By allowing the figure 8 loops to not be fixed in place, the suspension mechanism 15 material can move small distances without any restrictions. This movement allows for better and adaptive distribution of force, and it the suspension mechanism 15 material is resilient (such as monofilament) this freedom better utilizes the elasticity of the material to more evenly distribute forces. This in turn ensures a more uniform performance and force distribution, minimizes friction and other non-linear forces in the pre-loading and the xy-centering of the lens 10, and generally improves the accuracy of the total system. In experiments with alternative mechanical solutions, it was observed that side movement introduced into the lens 10, such as when drawing a line, had a very negative impact on accuracy. The friction between the lens 10 and the user's finger drags the lens 10 in the direction of the finger movement and the lens is transferring a force both downwards as well as a side fore. Due to the nature of most available force sensors, the measured force must be applied directly (90 degree angle) into the sensor membrane. The side force from the dragging of the finger typically introduced an accuracy error between 0% and 10% of the total distance between the sensors. With the force applied to the line A as illustrated in FIG. 2(C), most of this large force is applied to fixating the lens in the xy-plane. The force B in the xy-plane from the user's finger now became less then 1% of the total pre-loaded force in the xy-plane, basically eliminating or filtering out the impact of the side force, ensuring that only the z-directional force is being measured.

It should also be noted that also for a perfect mechanical construct where the lens 10 is resting perfectly on all the force sensors 12, there is still a need for an additional pre-loading force. By adding a pre-loading force to the lens that is greater than the weight of the lens 10, the lens 10 will remain in contact with the sensors 12 even if the touch screen system is held upside-down. The added pre-loading will also reduce mechanical interference and jitter.

Each of the materials (glass, tape, monofilament line) used in the implementation illustrated by FIG. 6 and FIG. 7 were selected due to their physical characteristics and could be substituted by other materials with similar characteristics.

One incidental benefit of the above improvements is that the mounting system for the lens 10 or top plate needed previously became unnecessary, since the lens/top plate is now suspended by the monofilament line, reducing the mechanical height of the system and eliminating the number of components.

Another important aspect of the invention is that it can be mass-produced at a reasonable cost. Reviewing the description above, it should become clear that the only additional components to the system are the four suspension mechanisms 14 and four semi-flexible padding elements 13 (such as Poron™) for the four force sensors 12, assuming the system design is using 4 sensors. For high volume production, the suspension mechanisms 15 may be pre-formed and added to the system during production automatically or by hand. Since material and lengths are known, the pre-loading force from the suspension mechanisms 15 can simply be calculated and the lines made accordingly. In addition, the mechanical design will be simpler and traditional pre-loading spring system and lens suspensions systems eliminated.

The above described figure 8-loop suspension mechanism provides the needed functionality for locking the lens/display in the xy-plane and yet allowing for small frictionless movement in the z-plan. For high volume production, it is however possible to further enhance the mechanical concept.

Figure 12:
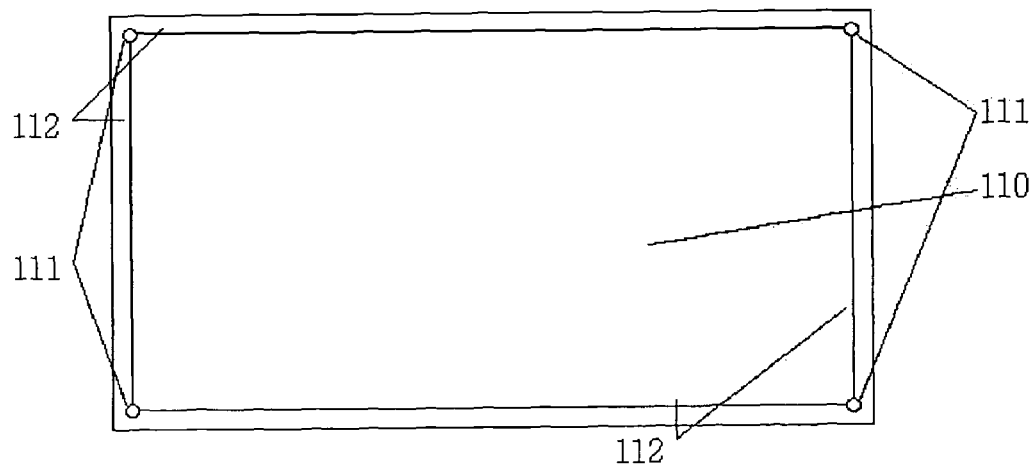
FIG. 12 illustrates an alternative mechanical implementation of the figure 8-look, using holes in the touch screen and base plate
Figure 14:
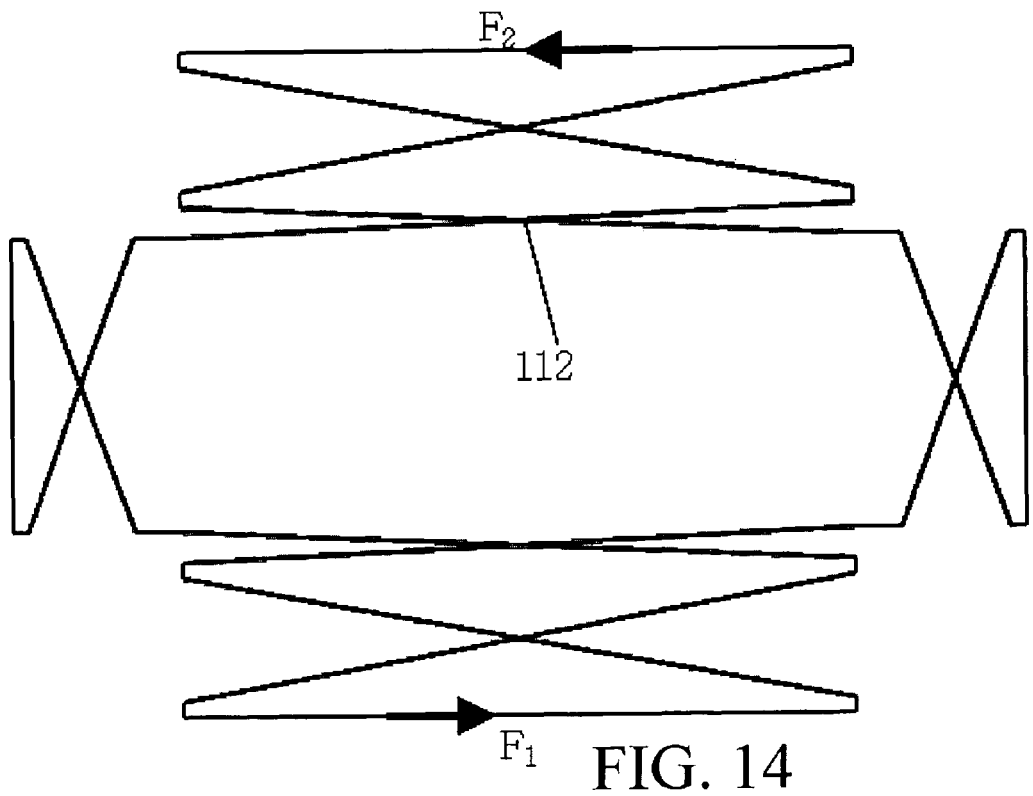
FIG. 14 illustrates how the forces are equalized in the suspension system if only a single monofilament is used.

FIG. 12 represents a display 110 where the touch glass 112, standard part of a touch LCD, extends beyond the boarders of the display module. The glass is also manufactured with one hole 111 in each corner. The underlying base plate (which may be a second glass plate, B-cover, PCB or other material serving as base plate to the system) is also equipped with corresponding holes. During the manufacturing process, the holes 111 make it a much simpler task to monofilament the system with one piece of wire/line 112. The result is:

Only one (1) monofilament to apply tension to and to clamp (into one continuous loop. Speeding up the production process Stringing the system through these holes is also simple and time quick By only using one monofilament, it is now possible to ensure that the tension in the system is the same everywhere, as illustrated in FIG. 14. This will ensure that the system equilibrium is a state where the preloading forces are the same over each of the sensor and the forces in the xy-plane are pulling the lens towards the middle of the lens, not accidentally pushing it closer towards one side and thereby increasing the risk of material interference with other components. Since the monofilament is connected and allowed to move freely, the tension in the monofilament $F_1$ is equal to the tension anywhere else in the monofilament $F_2$. Note that the lens must have low friction by the holes in order to allow the monofilament to move freely and thereby equalize the monofilament tension.

Figure 13:
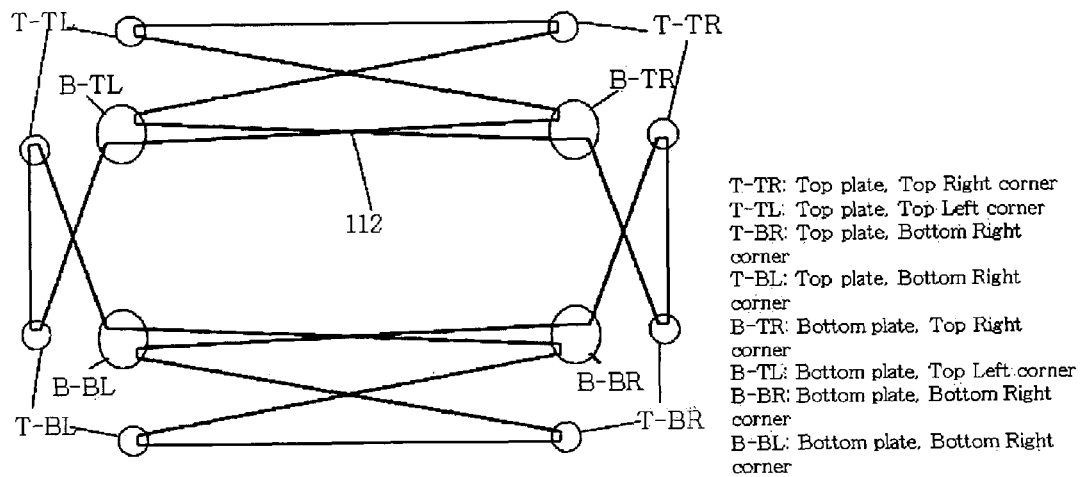
FIG. 13 illustrates the use on one single monofilament for building the figure 8-look suspension

FIG. 13 illustrates one pattern for stringing the unit with only one continuous monofilament wire 112. The monofilament/wire 112 is strung according to the pattern in FIG. 13 through both the touch lens and the base plate. As is shown, the monofilament will pass through each hole twice to the opposite hole. For example the monofilament reaches from the bottom plate top left (B-TL) hole to the top plate top right (T-TR) and bottom left (T-BL) holes For both basic suspension concepts described above, it shall be noted that the force sensor 12 shall be placed as close as possible to hole or the wrapping of the monofilament. If there is a significant distance, the pre-loading (the downwards force) from the monofilament can case the lens or base plane to bend. This material bend would then add or subtract unpredictable forces when the lens is pressed and thereby distort the measured touch coordinate.

It is possible to implement alternative systems based on the principles of the figure 8-loop, at least in part. It is not possible to fully replicate the force distribution between the xy-plane and the z-plane that is supported by the figure 8-loop, but it is possible to implement part of the principles.

Figure 9:
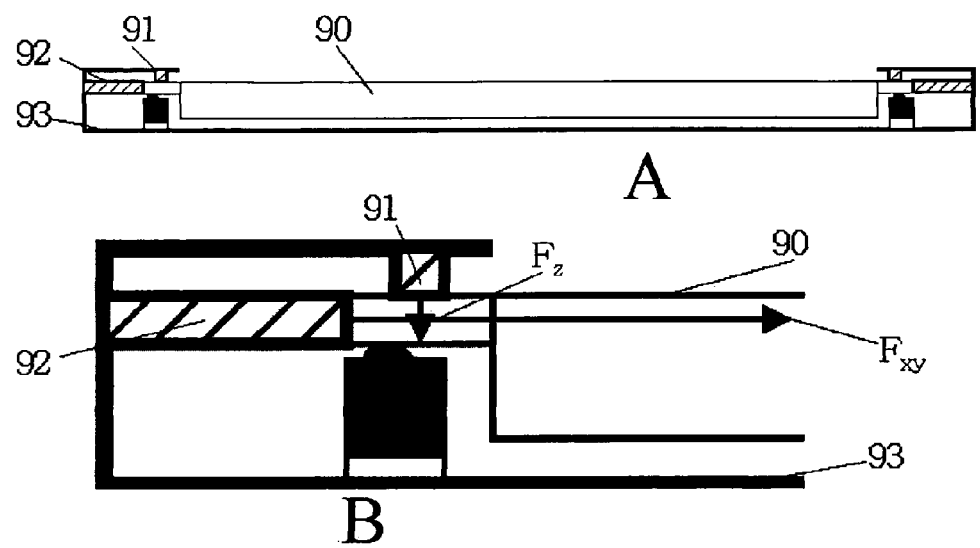
FIG. 9 illustrates an alternative implementation of the figure-8 suspension model, 3-dimensional force suspension.
Figure 10:
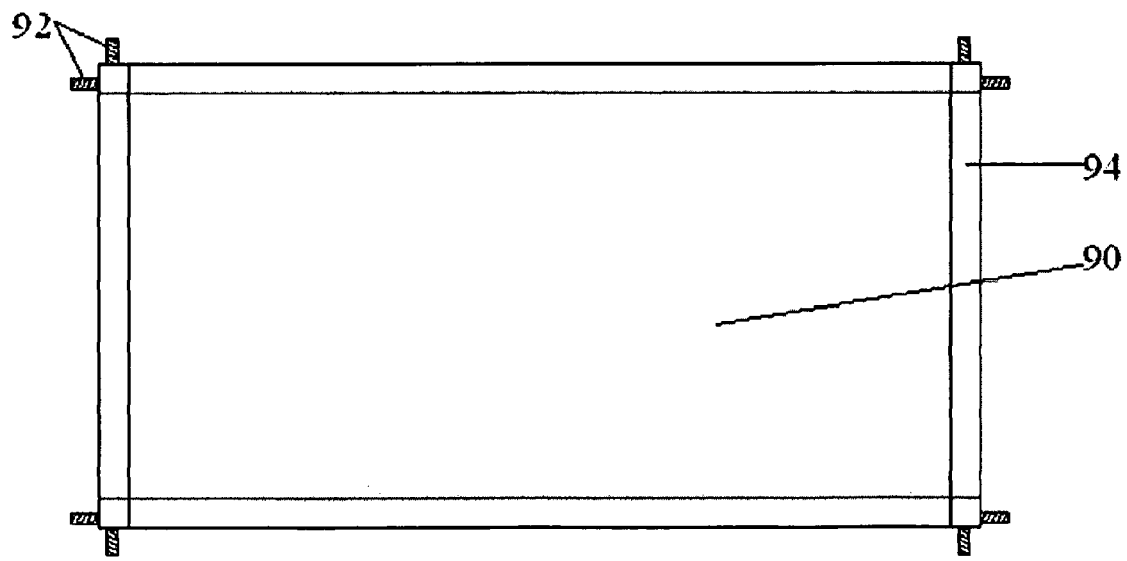
FIG. 10 shows FIG. 9 from an alternative view.

FIG. 9 illustrates an alternative implementation of the figure 8 suspension model, and FIG. 10 shows FIG. 9 from an alternative view. As seen in FIG. 9 the display is suspended by 8 strong spring elements 92, 2 in each corner. These 8 springs will apply large forces in the xy-plane $F_{xy}$. A small pre-loading force $F_z$ is applied directly above the sensor. The spring elements 92 will restrict movement in the xy-plane, but have no impact on any movement in the z-plane. This construct provides necessary pre-loading force, restriction of movement in the xy-plane as well as elimination of non-linear force from friction when pressure is applied. This solution can be made good enough for many implementation, although it can not reproduce the preciseness of the figure-8 loop construction. It shall also be noted that the forces in the xy-plane $F_{xy}$ are typically 20 to 40 times the size of the pre-loading forces $F_z$. The major difference with this suspension concept compared to the figure 8-loop is that each of the spring elements act as individual forces, while the wire in the figure 8-loop suspension ensures that the relationship between the forces in the xy-plane and the z-direction is maintained, as illustrated in FIG. 2.

It is also possible to implement the same type of mechanical construction described in FIG. 9, but using a reversed force in the xy-plane. Again, the important factor is that the xy forces are high enough to eliminate the xy-movement of the lens.

Figure 11:
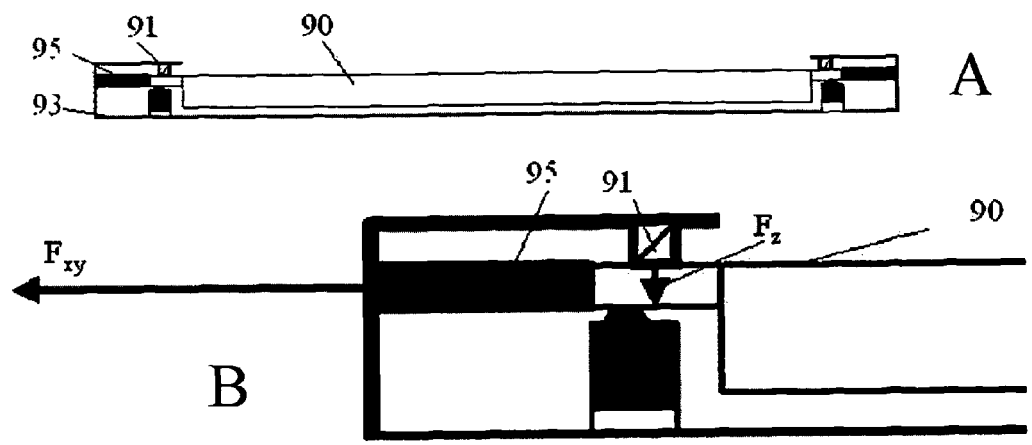
FIG. 11 illustrates an alternative implementation of the 3-dimensional force suspension

For example, FIG. 11 illustrates an alternative implementation of the figure-8 suspension model, where the lens 90 is pulled towards the corners with a force $F_{xy}$, substantially larger then the applied pre-loading force $F_z$.

Figure 15:
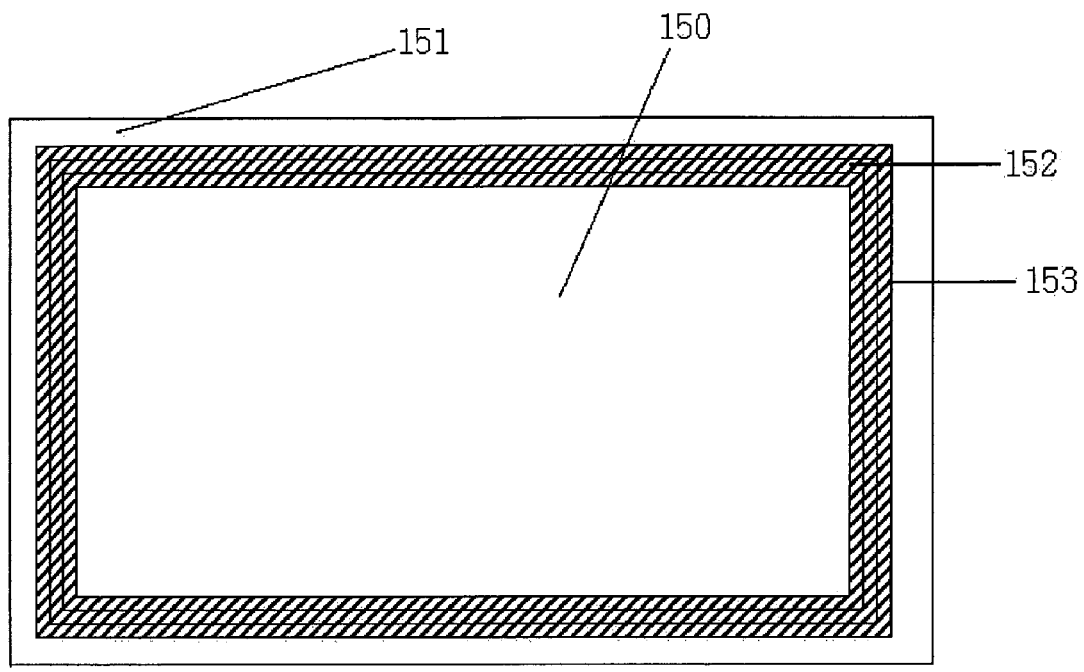
FIG. 15 illustrates an alternative mechanical implementation of the figure 8-look, the continuous suspension.

One additional suspension mechanism implementation is described in FIG. 15. It also captures the figure 8-concept to a high degree, although the concept is building on no additional side forces applied to the lens 150 in its equilibrium state, but allowing for a fast increase in opposite forces in case the lens is moved in a side direction. In this embodiment, the lens is attached to an outside frame 151 with a small airgap 152 between the bodies. The lens 150 is fixed in position relative to the frame 151 through a thin film 153, such plastic or adhesive tape. This tape can be kept very thin since it can be applied around the complete lens 150. If a side-force is applied to the lens 150, the tape is resisting the movement in the 2 parallel sides and the opposite side, virtually elimination any side movement.

Figure 16:
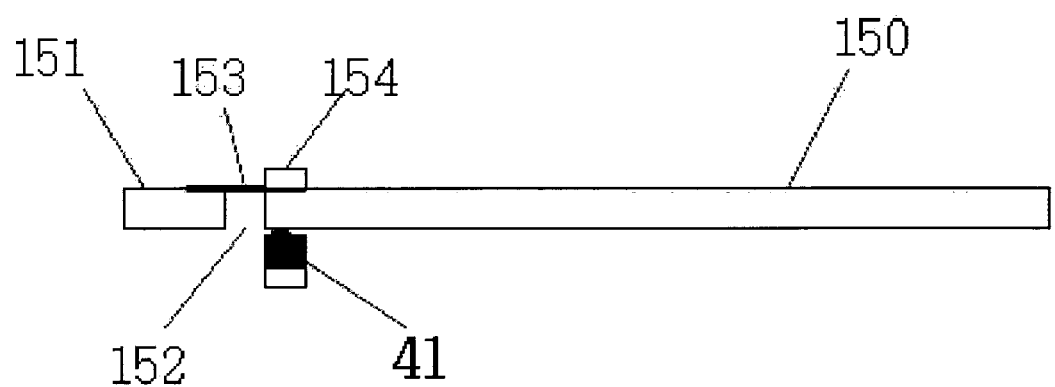
FIG. 16 illustrates an alternative mechanical implementation of the figure 8-look, the continuous suspension.

As can be observed in a side view of the system in FIG. 16, it is obvious that the tape 153 holding the lens 150 in place within the outside frame 151 will allow for small movements in the z-direction with only creating minimal friction forces. As the required movement is in the area of 0.01 to 0.2 mm, the forces created from the stretching of the tape will be minimal if any. In addition to the xy-plane control, the suspension solution must also provide a preloading force to ensure that the lens is always resting on the force sensor 41 and to reduce jitter from physical vibrations. A small preloading force is then applied directly over the sensor 41 through a spring or spring like material 154.

As for most mechanical concepts, the solution can typically be designed in multiple ways, each with advantages and disadvantages. The implementation described in FIG. 15 and FIG. 16 can also be implemented through integrated benders manufactured into the lens or added to the lens as described in FIG. 17.

Figure 17:
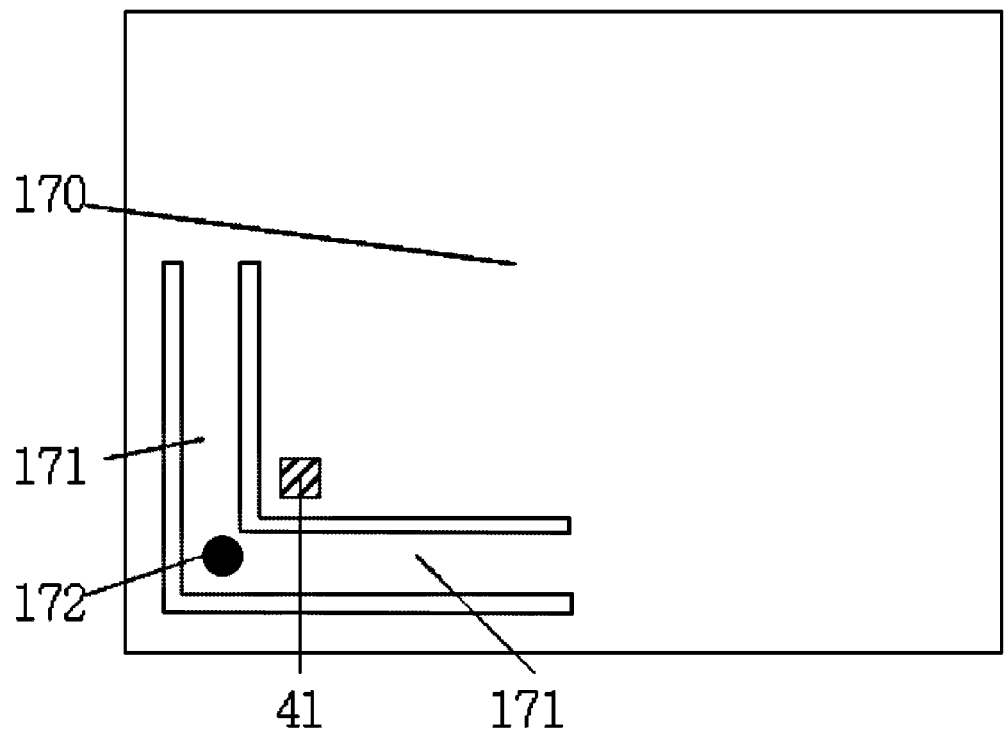
FIG. 17 illustrates another alternative mechanical implementation of the figure 8-look, using bender suspension, implemented as an integrated bender.
Figure 18:
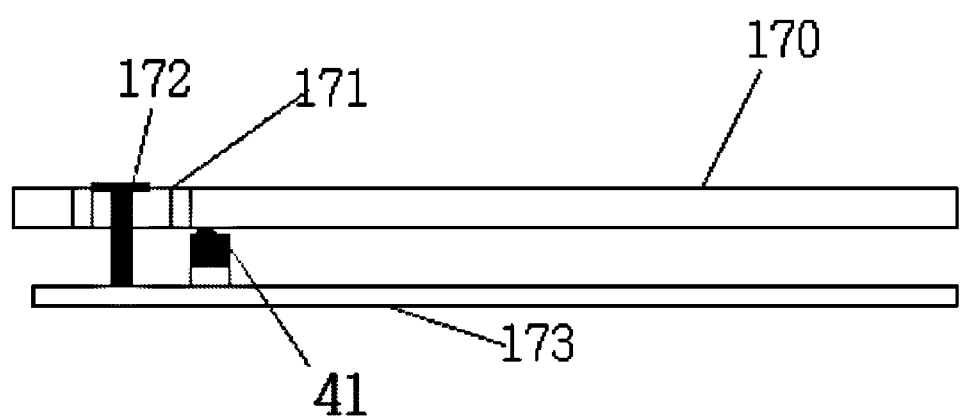
FIG. 18 illustrates another alternative mechanical implementation of the figure 8-look, using a bender suspension, integrated into the lens in a side view.

FIG. 17 illustrates one corner of the touch sensitive lens 170. In this embodiment, the lens 170 is notched with two parallel V-shaped notches to define a V-shaped beam or "bender." A screw 172 is inserted in the bender 171. As is better illustrated in FIG. 18, as the screw 172 is tightened, the bender 171 will bend towards the base plane 173, pulling the complete lens structure towards the base plane 173 and the force sensor 41. Since there are often conflicts between the materials the lens 170 should be rigid, while the bender 171 should act as a spring in the z-plane and rigid in terms of any movement in the xy-plane, it is often a preferred solution to use a flat metal spring for the bender 171.

It shall be noted that also this concept fulfills most of the benefits from the original 8-loop suspension mechanism, however, there will be minor forces within this beam suspension that will hinder the solution from performing as well as the 8-loop suspension, however, for mechanical implementations where a wired solution can not be used, this solution will provide a close performance, although the accuracy of the touch system is expected to be between 0% and 20% lower due to energy absorption in the benders and the change in pre-loading force as pressure is applied to the touch lens (the minor movement of the lens 170 will slightly reduce the built-in preloading forces from the bender 171. Obviously, using a known spring-like material for the bender 171 with a known spring constant (k) it is possible to adjust for much of the pre-loading changes due to the lens movement during a touch.

Figure 19:
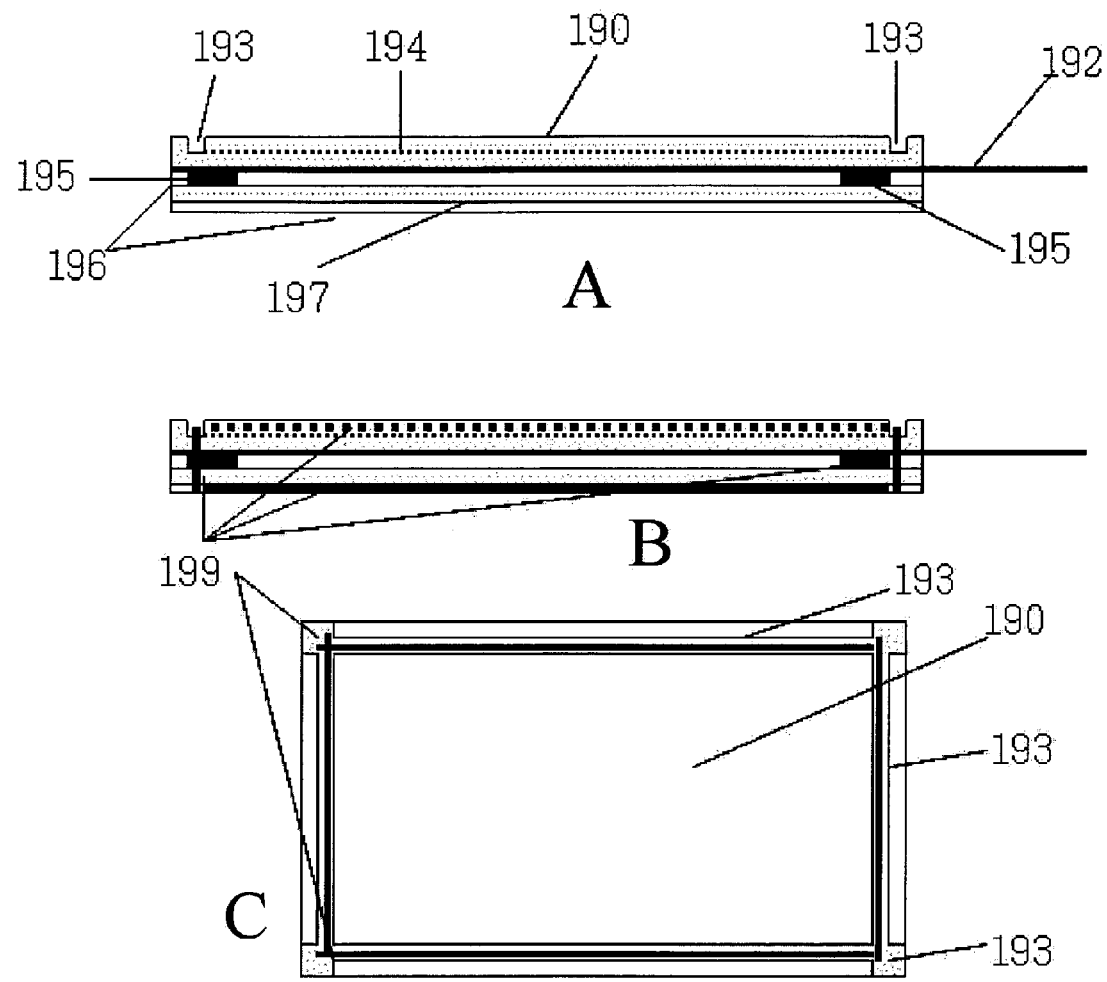
FIG. 19 illustrates a small display module with integrated touch screen suspension mechanism into the display module.

FIG. 19 illustrates a modular implementation of the figure 8-loop concept. Especially for small devices, such as mobile phones, it is vitally important that the added size is kept at a minimum and smaller design modifications may be required. In this integration example, the display "can" 196, that is the module packaging of the display, is extended around 1 mm to 2 mm in the x and y dimension, enough to create a small cavity 193 for the 8-loop string 199. The string/wire 199 may be looped in the recommended 8-loop or in a simplified (and slightly less accurate) 0-loop in order to reduce the required space. The string/wire 199 is still looped around a touch lens 190 and a supporting back plane 197, preloading the force sensors 195. For this particular application, these sensors are likely thin force resistive material based sensors, which can be made less then 0.5 mm thick. The sensor connection 192 to the outside electronics can be a separate connector or shared with the existing display and backlight connection system.

Figure 20:
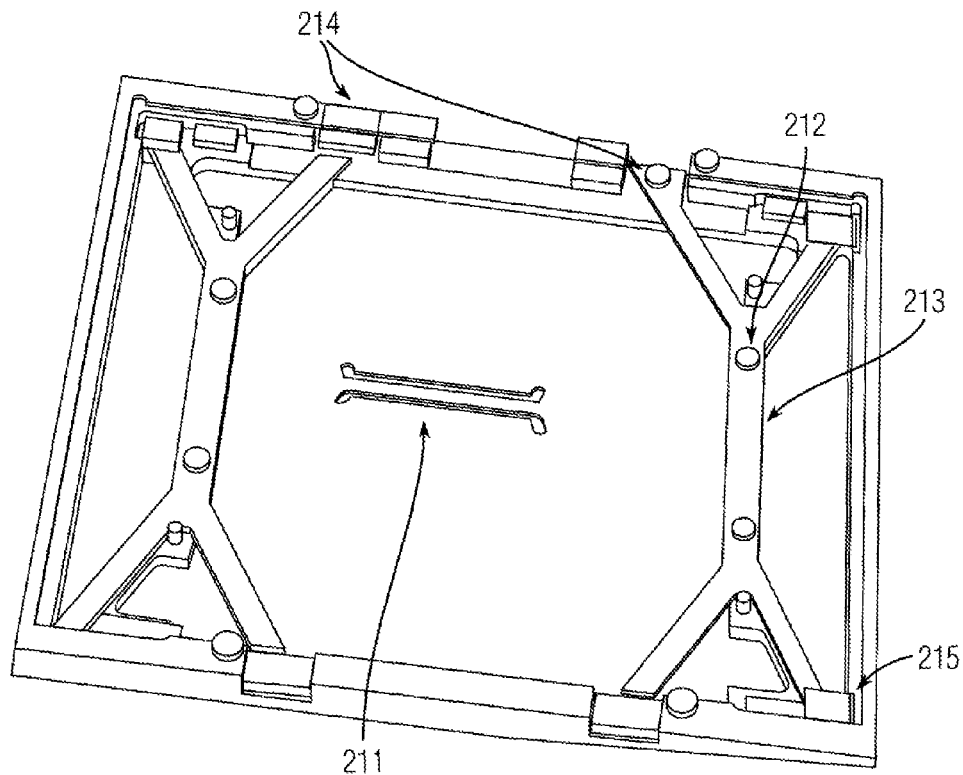
FIG. 20 is a side view of a 2 dimensional version of the above-described bender suspension incorporated in a touch screen assembly, which additionally includes a plurality of force sensors 70 mounted atop a circuit board 60.

FIG. 20 illustrates an alternative implementation of the bender 213 for a touch pad. In this implementation, the bender can be placed underneath the touch pad 211 since there is no need for a transparent lens. The benders 213 are mounted underneath the touch pad 211 and held in place with molded posts 212. The benders 213 are also fixed in the outside frame 214. The four force sensors 215 are located in each corner.

Figure 21:
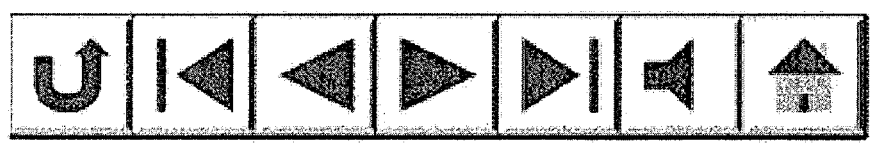
FIG. 21 is a top view illustrating the touch pad/touch strip of FIG. 20 as it may appear when integrated into a product such as a laptop PC with a row of touch sensitive keys.
Figure 22:
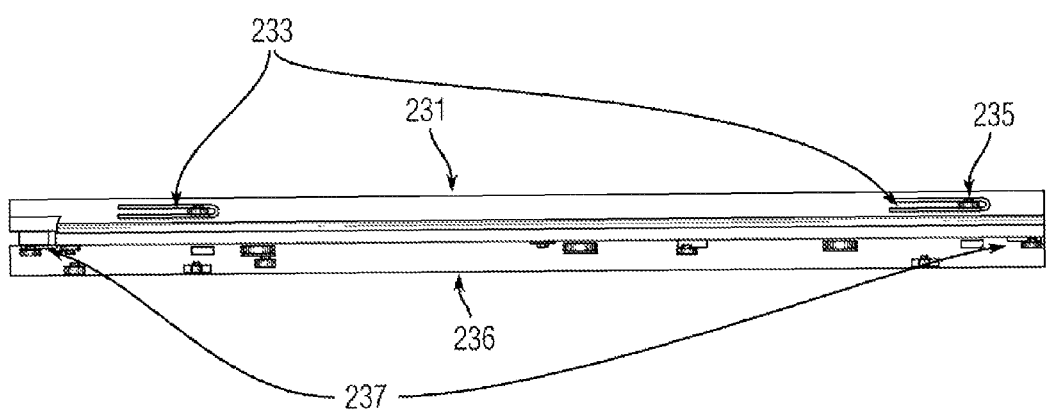
FIG. 22 is a bottom view of an alternative bender suspension implementation, for a product scenario where the benders can not be integrated into the lens as in FIG. 17.

FIGS. 22 and 21 illustrate a 2 dimensional implementation, such as a key strip shown in FIG. 22. In this embodiment, there is only a need for two force sensors 237 and two benders 233 and the slightly higher position error from using a bender concept would be acceptable in such application.

It should now be apparent that the above-described embodiments all provide a mechanical suspension for a touch screen display/pad that does not add any additional non-linear forces to a touch screen system, provides frictionless translation ability along one axis, and yet requires components to be fully constrained along the other two axes.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

INDUSTRIAL APPLICABILITY

Touch screens are being deployed in an increasing number of products using an array of several types of technology. As the products continually decrease in size, the demand for inexpensive, low-profile and precise touch screens is increasing. One type of touch screen senses differential-pressure of the lens or LCD using four corner-mounted force sensors. However, this type of touch screen also requires a suspension system for the lens/LCD, and existing suspension systems introduce friction or non-linear forces into the system that disrupts the measurements of the force sensors. Therefore, there is significant industrial applicability in the present invention which provides a differential-pressure force sensing suspension system which overcomes some of the deficiencies of the prior art.

What is claimed is:

1. A suspension for a touch screen display having a floating touch panel opposed to a fixed base panel, comprising:
at least one suspension mechanism defined by a length of flexible line looped about both said floating touch panel and opposed fixed base panel
wherein said at least one suspension mechanism is monofilament line.

2. The suspension for a touch screen according to claim 1, wherein said at least one suspension mechanism is not secured to said floating touch panel and opposed fixed base other than by said loops.

3. The suspension for a touch screen according to claim 1, wherein said at least one suspension mechanism is plastic.

4. The suspension for a touch screen according to claim 1, wherein said suspension mechanisms move freely.

5. A suspension for a touch screen display including a flat touch panel opposed to a flat support base, comprising:
a plurality of suspension mechanisms each defined by at least one loop encircling said flat touch panel and at least one loop encircling said flat support base, said at least one flat touch panel loop and said at least one flat support base loop being connected; and
further comprising padding beneath each of a plurality of force sensors underlying said flat touch panel.

6. The suspension for a touch screen display according to claim 5, wherein said padding comprises a thin layer of flexible microcellular polyurethane foam material.

7. A suspension for a touch screen display including a flat touch panel opposed to a flat support base, comprising:
a plurality of suspension mechanisms each defined by at least one loop encircling said flat touch panel and said flat support base,
wherein said at least one loop further comprises two loops including an upper and lower loop joined in a figure-eight, the upper loop encircling said flat touch panel and the lower loop encircling said flat support base.

8. The suspension for a touch screen display according to claim 7, wherein said flat touch panel and flat support base further comprise a display module and printed circuit board, respectively.

9. The suspension for a touch screen display according to claim 7, wherein said flat touch panel and flat support base further comprise a touch lens and backplane, respectively.

10. A suspension for a touch screen display including a lens and backplane, comprising:
   a plurality of suspension mechanisms each attached between said lens and backplane for providing minimal-friction translation ability toward and away from each other, while constraining relative lateral movement,
   wherein each of said suspension mechanisms is defined by an upper and lower loop joined in a figure-eight, the upper loop encircling said lens along one side and said lower loop encircling said backplane along one side.

11. A suspension for a touch screen display including a lens and backplane, comprising:
   a plurality of suspension mechanisms each attached between said lens and backplane for providing minimal-friction translation ability toward and away from each other, while constraining relative lateral movement,
   wherein each of said suspension mechanisms comprises a resilient section of said lens defined by opposing notches through said lens, each said resilient section being attached at one or more points to said backplane.

12. The suspension for a touch screen according to claim 11, wherein said lens is in contact with four underlying force sensors mounted at four corners of said lens.

13. The suspension for a touch screen according to claim 12, further comprising a thin layer of flexible microcellular polyurethane foam padding beneath each of said force sensors.

14. A suspension for a touch screen display including a display module and backplane, comprising:
   a plurality of suspension mechanisms each defined by an upper and lower loop joined in a figure-eight, the upper loop encircling said display module along one side and said lower loop encircling said backplane along one side.

15. The suspension for a touch screen according to claim 14, further comprising padding beneath each of said force sensors.

16. The suspension for a touch screen according to claim 14, further comprising four edge-mounted suspension mechanisms each straddling two of said force sensors.

17. The suspension for a touch screen according to claim 16, wherein said four edge-mounted suspension mechanisms define a three-dimensional suspension.

18. A suspension for a touch screen display including a backplane and a display module having a display side and an opposing back side, comprising:
   a plurality of force-sensing resistive (FSR) sensors affixed to said backplane and engaged to said back side of said display module; and
   a plurality of suspension mechanisms each comprising a resilient spring affixed to said backplane and to said display module and attached there between for providing minimal-friction translation ability toward and away from each other, while constraining relative lateral movement,
   wherein each of said suspension mechanisms imposes a biasing force on said display module biasing said display module toward said backplane thereby preloading said plurality of FSR sensors.

19. The suspension mechanism of claim 18 wherein said biasing force exceeds the weight of said touch screen display.

20. The suspension mechanism of claim 18, further comprising a thin layer of flexible microcellular polyurethane foam padding beneath each of said plurality of force sensors engaged to said back side of said display module.

21. The suspension of claim 18 wherein said resilient spring comprises a flat spring, said flat spring affixed to said back side of said display module and at least one end to said backplane.

22. The suspension of claim 21 wherein said flat spring is affixed to said backplane at two ends and affixed to said display module at least one point between said two ends.

23. The suspension of claim 21 wherein said backplane comprises a frame encircling said display module, said at least one end of said flat spring affixed to said frame.

24. The suspension of claim 18,
   wherein said display module further comprises a lens affixed to said display side of said display module, an edge portion of said lens extending laterally beyond a display portion of said display module, said edge portion comprising said bendable member; and
   wherein said suspension mechanism comprise a rigid connection between said bendable portion and said backplane.

25. The suspension of claim 24 wherein said rigid connection is a post.

26. The suspension of claim 24 wherein said rigid connection is a screw.

27. The suspension of claim 24 further comprising a notch in a surface of said lens, said notch define said bendable portion of said lens.

28. The suspension mechanism of claim 24, further comprising padding beneath each of said plurality of force sensors engaged to said back side of said display module.

* * * * *